US012671882B1

(12) United States Patent
Isaev et al.

(10) Patent No.: US 12,671,882 B1
(45) Date of Patent: Jun. 30, 2026

(54) SYSTEMS AND METHODS FOR GENERATING CUSTOMIZED MEDIA CONTENT

(71) Applicant: Amazon Technologies, Inc., Seattle, WA (US)

(72) Inventors: Vladislav Isaev, West Vancouver (CA); Yash Chaturvedi, Issaquah, WA (US); Steven James Cox, Mill Creek, WA (US); Jacobus Hendrik du Preez, Liberty Hill, TX (US); Yongjun Wu, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/489,251

(22) Filed: Oct. 18, 2023

(51) Int. Cl.
| | |
|---|---|
| *H04N 21/234* | (2011.01) |
| *H04N 21/466* | (2011.01) |
| *H04N 21/482* | (2011.01) |
| *H04N 21/81* | (2011.01) |
| *H04N 21/8549* | (2011.01) |

(52) U.S. Cl.
CPC ....... *H04N 21/8549* (2013.01); *H04N 21/234* (2013.01); *H04N 21/4667* (2013.01); *H04N 21/482* (2013.01); *H04N 21/8106* (2013.01)

(58) Field of Classification Search
CPC ............. H04N 21/8549; H04N 21/234; H04N 21/4667; H04N 21/482; H04N 21/8106
See application file for complete search history.

(56) References Cited

U.S. PATENT DOCUMENTS

| | | | | |
|---|---|---|---|---|
| 11,863,848 | B1 * | 1/2024 | Lythcott-Haims | .... G06F 3/0482 |
| 2012/0236201 | A1 * | 9/2012 | Larsen | ................... G06Q 30/02 |
| | | | | 348/468 |
| 2019/0200064 | A1 * | 6/2019 | Louis | ..................... G06F 16/951 |
| 2024/0305865 | A1 * | 9/2024 | Hou | ..................... H04N 21/431 |

* cited by examiner

*Primary Examiner* — Rong Le
(74) *Attorney, Agent, or Firm* — Eversheds Sutherland (US) LLP

(57) ABSTRACT

Systems and methods for generating customized media content are provided (for example, trailers or recaps for a movie or television show). For example, the system may generate a trailer to a television show that is tailored to a specific user, such as a trailer that includes action-specific scenes for a user who often views content in an action-based genre. The system may receive as an input a text or voice-based query from the user (or the system may be automated and may receive user historical data as an input). Based on the input, one or more computing models may generate a text-based narrative to be used with the customized content. Once the narrative is generated, the one or more models may then identify specific video frames to include in the customized content. The video frames may then be stitched together and the customized content may be generated using the stitched video frames and the narrative.

18 Claims, 8 Drawing Sheets

400 ─↘

Training one or more computing models using a set of media content ╌ 410

Receiving, using one or more processors, a first input associated with a first user, the first input being indicative of first customized media content to be generated based on at least a first subset of the set of media content ╌ 420

Generating, by the one or more computing models and based on the first input, a first narrative ╌ 430

Identifying, by the one or more computing models and based on the first narrative, one or more first video frames of the set of media content ╌ 440

Generating, by the one or more computing models, the first customized media content using the first narrative and the one or more first video frames ╌ 450

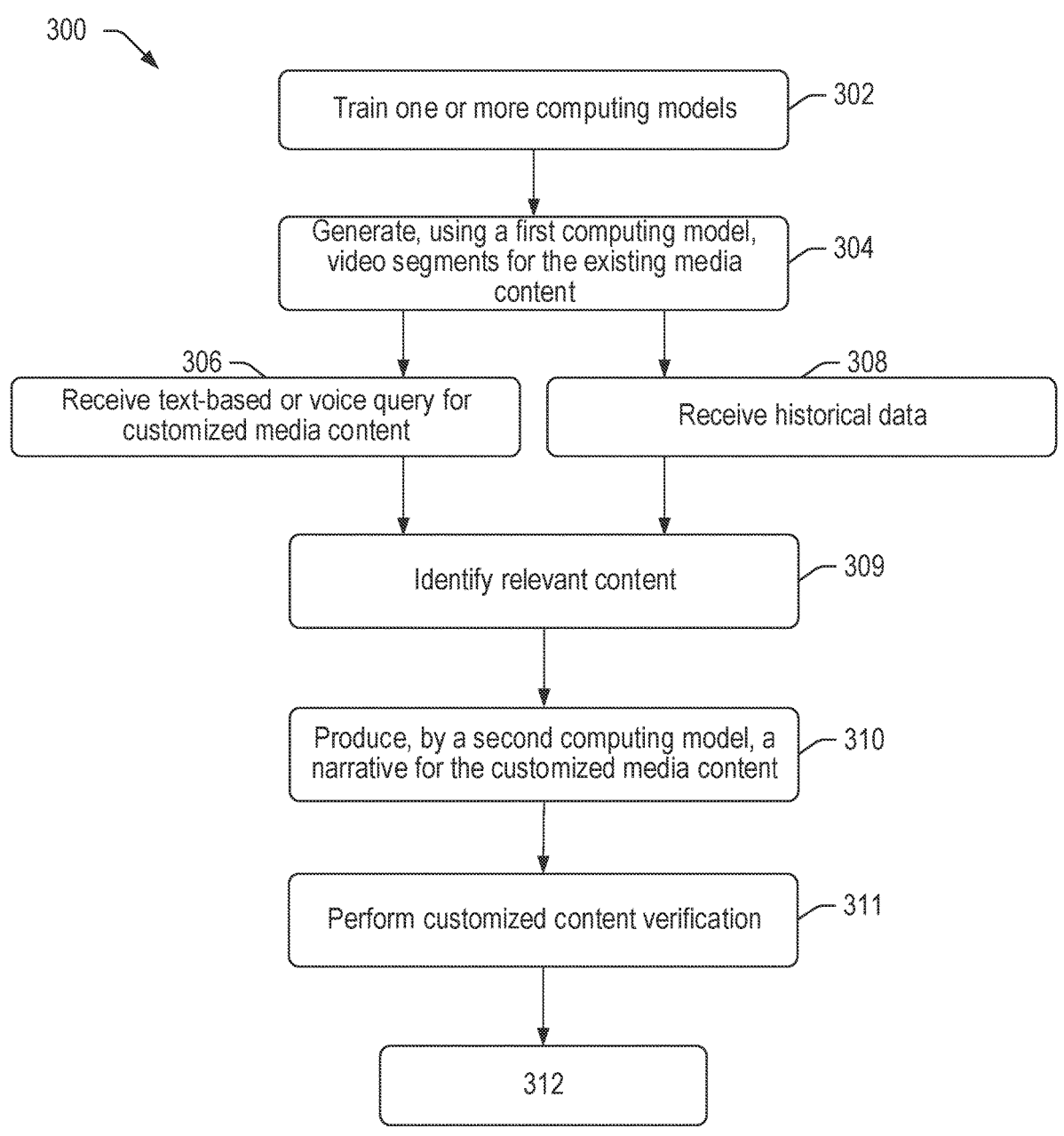

300

Train one or more computing models — 302

Generate, using a first computing model, video segments for the existing media content — 304

306 — Receive text-based or voice query for customized media content

308 — Receive historical data

Identify relevant content — 309

Produce, by a second computing model, a narrative for the customized media content — 310

Perform customized content verification — 311

Identify, by a third computing model and based on the text narrative, one or more video frames for the customized media content — 312

Identify video segments including the one or more video frames — 314

Receive user edits to the narrative and/or the one or more video frames — 316

Generate customized media content — 318

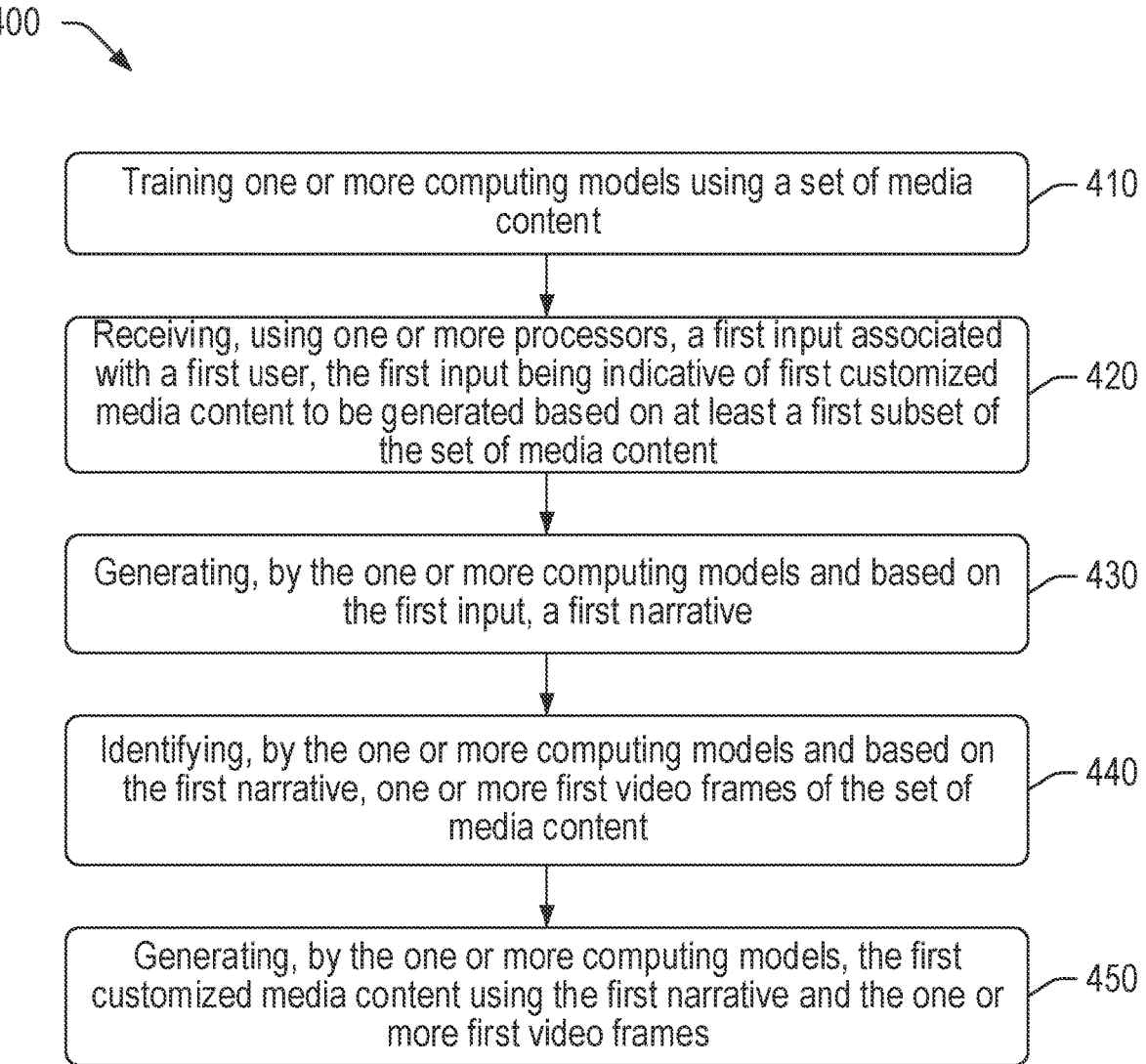

400

Training one or more computing models using a set of media content — 410

Receiving, using one or more processors, a first input associated with a first user, the first input being indicative of first customized media content to be generated based on at least a first subset of the set of media content — 420

Generating, by the one or more computing models and based on the first input, a first narrative — 430

Identifying, by the one or more computing models and based on the first narrative, one or more first video frames of the set of media content — 440

Generating, by the one or more computing models, the first customized media content using the first narrative and the one or more first video frames — 450

FIG. 4

SYSTEMS AND METHODS FOR GENERATING CUSTOMIZED MEDIA CONTENT

BACKGROUND

Viewers of media content, such as movies and television shows, often desire to view more concise videos that provide information about the media content. For example, a viewer may watch a trailer for a movie to obtain some information about the contents of the movie before deciding if they wish to watch the full movie. As another example, a viewer may watch a season recap for a prior season of a television show before beginning a new season in order to refresh their memory regarding events of the prior season. However, these videos are often created for a wider audience and the content of the videos is not tailored to the preferences of individual users.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may depending on the context, encompass a plural number of such components or elements and vice versa.

FIGS. 3A-3B depict a flow diagram for generating customized media content in accordance with one or more example embodiments of the disclosure.

FIG. 4 depicts a method for generating customized media content in accordance with one or more example embodiments of the disclosure.

DETAILED DESCRIPTION

Figure 1A:
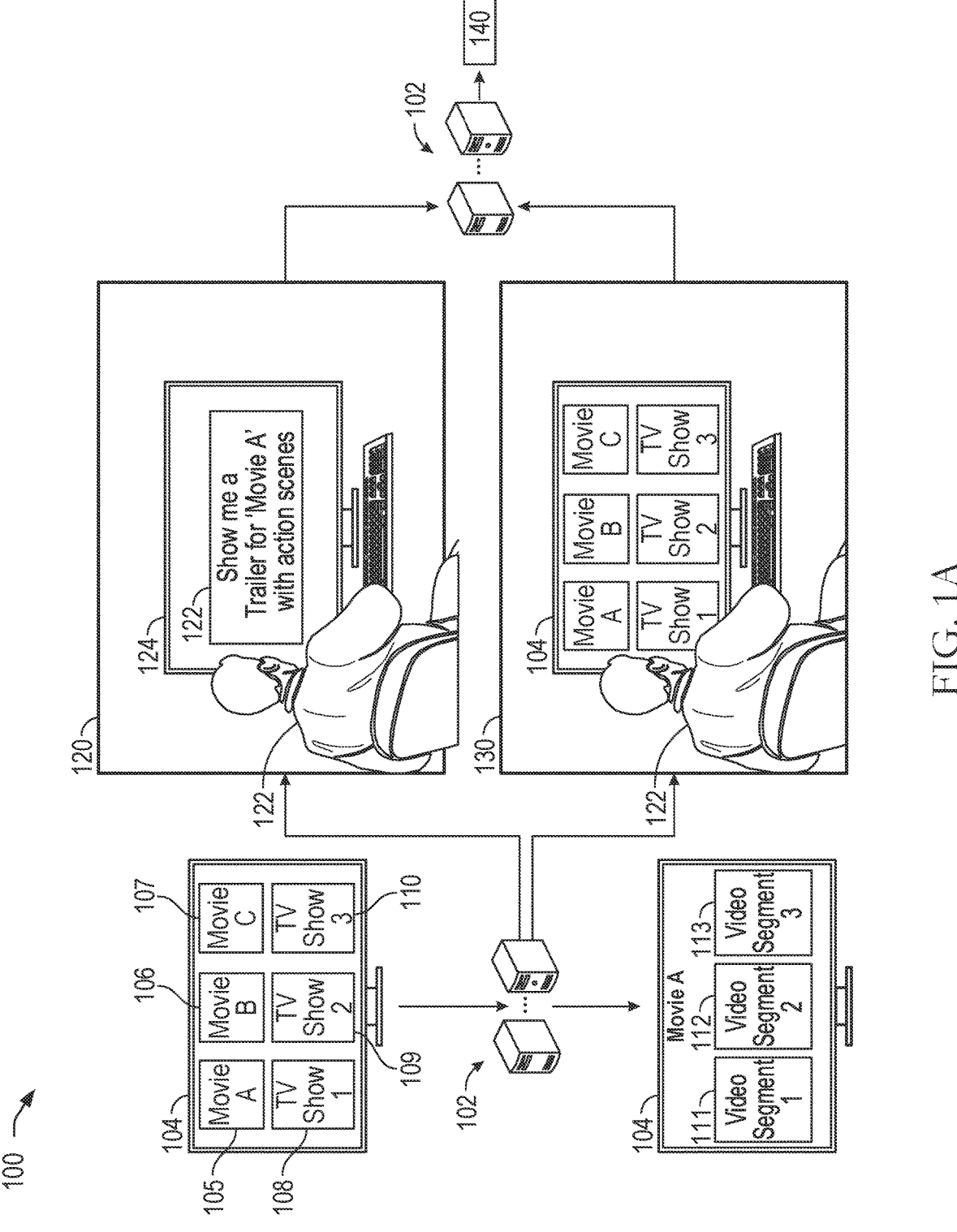
FIGS. 1A-1B depict an example use case for generating customized media content in accordance with one or more example embodiments of the disclosure.

This disclosure relates to, among other things, systems and methods for generating customized media content. Media content may refer to any type of content, such as video content, audio content, a combination thereof, and/or any other types of content. Particularly, the systems and methods may involve generating media content that is customized to a specific user. In some instances, the customized media content may include a trailer or recap for the media content that is tailored for a specific user (however, any other types of customized media content may also be generated beyond trailers and recaps). For example, a first user may prefer action content and a second user may prefer dramatic dialogue. Continuing this example, the system may generate two different custom trailers for the same movie based on the unique preferences of the two users. For example, a first trailer may include more action scenes from the first movie and the second scene may include more dramatic dialogue from the first movie. Accordingly, the systems and methods provide the technical benefit of automatically generated user-tailored media content, rather than presenting the same media content to different users, regardless of the preferences of those users.

The customization of the customized content may also include any other types of customization. For example, depending on the user for which the content is generated, the content may focus on different characters (for example, a first user may be more interested in a detective character than a villain character) or may focus on different storylines. The customization may also extend beyond the content itself to parameters associated with the content, such as the length of the customized content, the amount of audio and/or text shown in the customized content, the soundtrack provided in the customized content, etc.

In embodiments, the customized media content may be generated using one or more computing models. A computing model may generally refer to any type of model, such as artificial intelligence, machine learning, or the like. Particularly, the one or more models may include a first model, a second model, and a third model. The first model may be a model used to produce a text-based narrative associated with the customized media content (for example, the first model may be a large language model). The second model may be a model used to determine one or more video frames of the existing media content to be included in the customized media content (for example, the second model may be a large multimodal visual model). The third model may be a shot detection model that is used to separate a particular media content into segments. Any reference herein to any specific type of model is not intended to be limiting and any other type of model may also be used. Additionally, any reference to "first," "second," "third," etc. is not intended to be limited to being associated with a particular type of model, but rather to provide an indication of distinct models. For example, although reference may be made to the "first model" being a large language model used to generate text-based narratives, a "first model" may also refer to the large multimodal visual model used to identify video frames or the shot detection model used to produce media content segments as well.

The one or more models may be pre-trained based on the pre-existing media content that exists within the system. For example, if the system may be associated with a content system. A user may access the content system through a device, such as a smartphone, laptop or desktop computer, tablet, smart television, etc. Through the content system, the user may be able to select and view any of the pre-existing media content. For example, the content system may host various movies and television shows (or any other type of media content) that the user may view on the device. The one or more models may be pre-trained using some or all of the media content that exists on the content system. As aforementioned, the content may not necessarily be limited to video content, and the one or more models may be pre-trained on any non-video content as well, as well as any other types of content.

Additionally, prior to receiving any inputs that trigger the generation of customized media content for a user, the third model (for example, the shot detection model) may produce segments of the existing media content. For example, the shot detection model may identify locations within a television show at which the camera shots change and may produce distinct segments of the television show based on these shot changes. For example, in a crime mystery television show, the third model may generate a first segment in which a detective is shown driving to a crime scene and a second segment in which the camera shot changes to show a police officer at the crime scene having a conversation with the detective. The segments may not necessarily be limited to changes in camera shots. For example, the third model may also produce media content segments for each of the distinct scenes within the television show as well (and/or may produce media content segments based on any other types of criteria).

In embodiments, the process by which the customized media content is generated for a user may begin with an input. In some instances, the input may be a manual input provided by a user. In such instances, the input may be a text-based query, a voice input, etc. For example, the user may input a text-based query requesting "a trailer for 'Movie A' including action scenes" (the user may similarly provide the same request as a voice input). However, the inputs may not necessarily require manual user input. That is, in other instances, the inputs may automatically be obtained by the system. For example, these automated inputs may include historical data associated with the user, such as types of media content the user has previously viewed on the content system, as well as any other types of relevant data.

Once the input is received by the system, the one or more models may initiate the process of generating the customized media content for the user based on the input. In embodiments, the first model may receive the input and may generate a text-based narrative for the media content based on the input. The text-based narrative includes a unique narrative that is generated based on the input and the media content. That is, the text-based narrative is not limited to only the existing narrative of the media content (for example, dialogue of the characters, etc.), and may, in some instances, not include any of the existing narrative. That is, the contents of the narrative may be uniquely generated by the one or more models. An example of such a narrative is provided in FIGS. 1B and 2. The one or more models may also be configured to generate a voiceover narration for the customized media content based on the text-based narrative as well.

The text-based narrative that is generated by the first model may then be provided to the second model for processing. Using the text-based narrative as an input, the second model may identify one or more video frames of the media content for which the customized media content is being generated. Continuing the aforementioned example, the second model may identify one or more video frames of "Movie A" that are most relevant to the text-based narrative produced by the first model. For example, the narrative may state "Opening scene: Dramatic music plays as the camera pans across the Washington D.C. skyline." Based on this portion of the narrative, the second model may identify one or more video frames of "Movie A" including a camera shot panning across the Washington D.C. skyline. Additional video frames may be identified by the second model for any other portions of the text-based narrative produced by the first model as well.

In embodiments, the process may also involve the one or more models determining which of the segments produced by the third model include the one or more video frames identified by the second model. That is, the one or more models may identify individual video frames or groups of video frames that may not necessarily include all of the video frames included within the associated camera shot, scene, etc. Once the second model identifies video frames deemed to be relevant to the text-based narrative, the media content segments produced by the third model may be leveraged and the video frames within those segments may be compared to the video frames identified by the second model. Accordingly, an entire segment including a given camera shot or scene may be used to generate the customized media content.

The resulting outputs of the one or more computing models may be a text-based narrative and a set of video frames that may be combined to form the customized media content that may be presented to the user. To generate the customized media content, the one or more video frames may be "stitched" together, or combined, into a continuous media content (for example, a trailer, recap, or any other type of customized media content). Portions of the narrative may be superimposed on the media content as well. Additionally, a computer-generated voiceover narrative may also be added to the customized media content as well. The end result may be media content (such as a trailer, recap, etc.) that is automatically generated using the computing models that is uniquely tailored to a specific user.

Figure 1B:
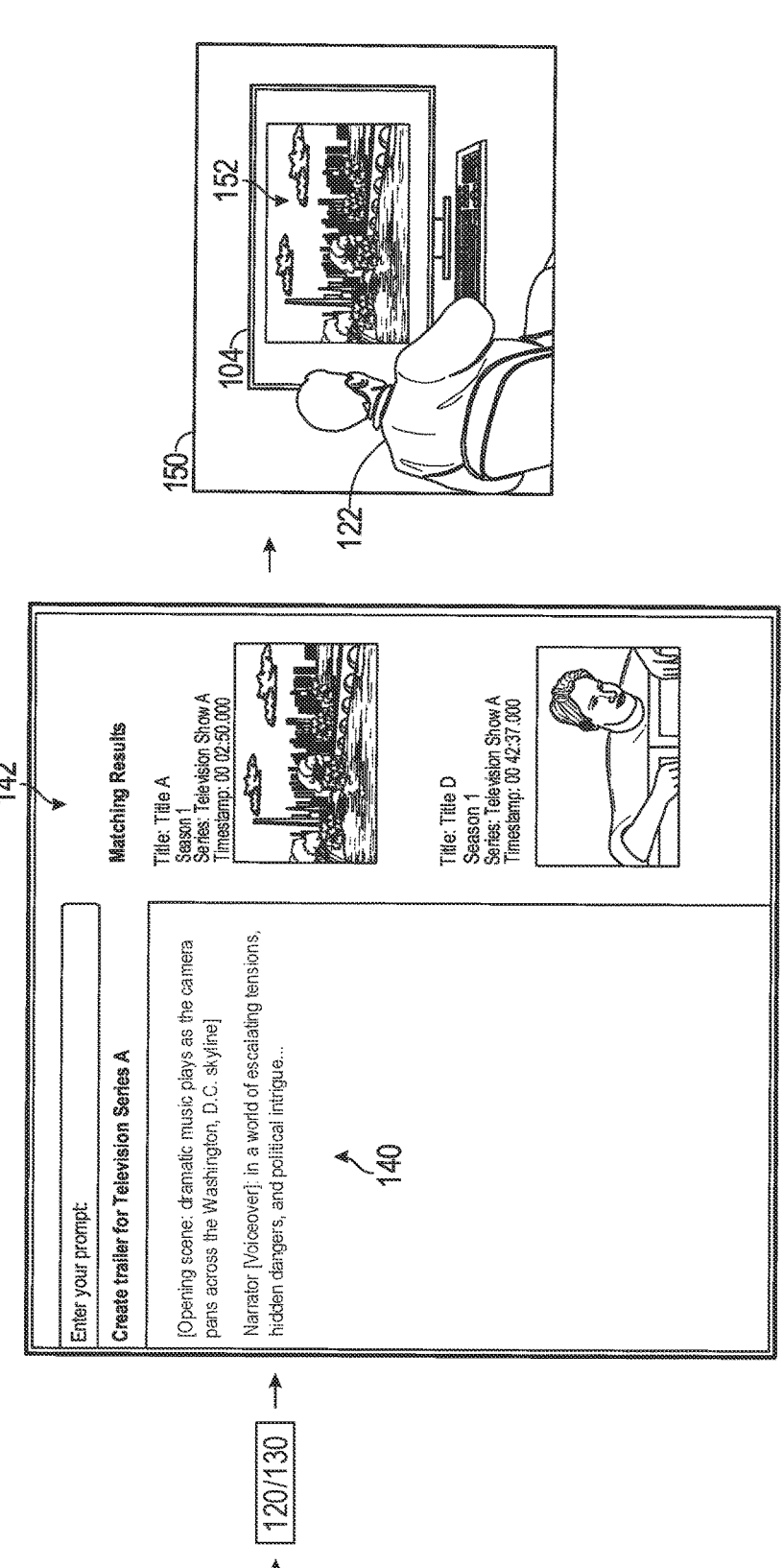

Referring to FIGS. 1A-1B, an example use case 100 for generating customized media content is shown.

The use case 100 begins at FIG. 1A with one or more computing model(s) being trained using existing media content within a content system. For example, content system 104 is shown as including a first movie 105, a second movie, a third movie 107, a first television show 108, a second television show 109, and a third television show 110. However, this is merely exemplary and the content system 104 may also include any other number of movies, television shows, and any other type of media content (or non-media content).

The one or more computing model(s) 102 generally refer to any type of model, such as artificial intelligence, machine learning, or the like. In embodiments, the one or more computing model(s) 102 may include a large language model, a large multimodal visual model, and a shot detection model. The large language model may be a model used to produce a text-based narrative associated with the customized media content. The large multimodal visual model may be used to determine one or more video frames of the existing media content to be included in the customized media content. The third model may be a shot detection model that is used to separate a particular media content into segments. However, any other different combinations of types of models may also be used.

FIG. 1A also shows that the one or more model(s) 102 may also produce video segments for the media content included in the content system 104. For example, the figure shows that a first video segment 111, a second video segment 112, and a third video segment are produced for the first movie 105 in the content system 104. For example, the shot detection model may identify locations within a television show at which the camera shots change and may produce distinct segments of the television show based on these shot changes. As aforementioned, the segments may not necessarily be limited to changes in camera shots. For example, the third model may also produce media content segments for each of the distinct scenes within the television show as well (and/or may produce media content segments based on any other types of criteria). These video segments may then be leveraged when the one or more computing model(s) are identifying portions of the media content to add to customized media content that is generated.

Continuing with scenes 120 and 130, two alternative scenarios for triggering the generation of customized media content are shown. The first scene 120 shows a scenario in which a user 122 manually inputs a text-based query 122 into a device 124 requesting for the customized media content to be generated. For example, the text-based query 122 shown in the first scene 120 is "trailer for 'Movie A' with action scenes." The device 124 shown in the scene 120 is a desktop computer, however, any other type of device may also be used, such as a laptop computer, tablet, smart television, etc. Alternatively, the user may provide the query as a voice input to the device 124 or may provide the query as any other type of input as well.

The second scene 130 shows another scenario in which the customized media content is automatically generated without requiring any manual query from the user 122 to generate the customized media content. Instead, the customized media content may be generated based on historical data associated with the user 122. For example, the second scene 130 shows the user 122 browsing the content system 104. As the user 122 views media content on the content system 104, data about the viewing preferences of the user 122 may be obtained (for example, the typical genre of media content that the user watches and/or any other types of relevant data). The customized media content may then be generated using this data in a number of different circumstances. For example, if the historical data indicates that the user 122 has watched the first season of "TV Show 1" and a second season is about to be released on the content system, then the one or more models 120 may automatically generate a season recap for season one of the television show that the user 122 may view on the content system before viewing the second season.

Additionally, in embodiments, a combination of manual input and historical data associated with the user 122 may be used in the generation of the customized media content. For example, the user 122 may still provide the text-based query (or other type of query), but the historical data associated with the user 122 may still be leveraged to further tailor the customized media content that is generated to the preferences of the user 122.

Once a scenario for triggering the generation of customized media content occurs, the use case 100 proceeds with the information causing the triggering of the generation of the customized media content being provided to the one or more computing model(s) 102 to generate the customized media content. For example, the text-based query (or any other type of manual input) shown in scene 120 may be provided to the one or more model(s) 102 as an input. The one or more computing model(s) 102 may then generate individual elements that may be combined to form the customized media content.

FIG. 1B shows a text-based narrative 140 produced by the one or more model(s) 102. Also shown are one or more video frames 142 identified by the one or more computing model(s) 102 based on the text-based narrative. That is, the text-based narrative 104 may first be generated by the one or more computing model(s) and then the one or more computing model(s) may identify video frames from the existing media content to include in the customized media content based on the contents of the text-based narrative 140. However, this order of operations is merely exemplary and the text-based narrative and one or more video frames may also be produced simultaneously or in any other order. Additional details about the text-based narrative 140 and one or more video frames 142 are provided in at least FIGS. 2-5.

Finally, scene 150 shows the customized media content 152 being presented to the user 122 for viewing through the content system 104. The user 122 may select the customized content 152 to view the customized content. In some instances, the customized media content may also automatically be presented to the user. For example, if the customized media content is a season recap for a first season of a television show, the season recap may be automatically played for the user 122 when the user selects the television series through the content system 104 to view the second season. The customized media content may also automatically be presented to the user 122 in any number of other scenarios.

Figure 2:
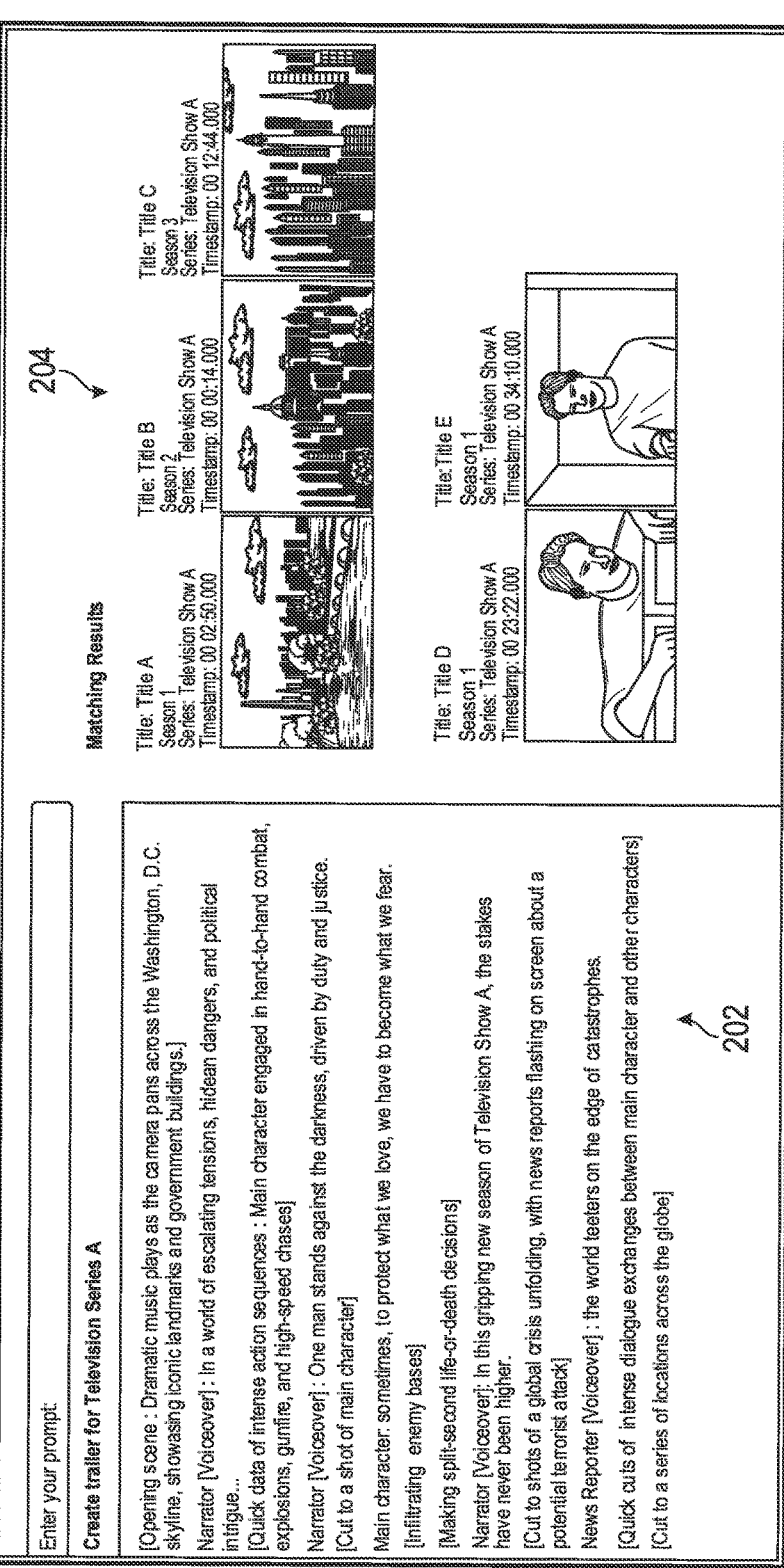
FIG. 2 depicts example outputs generated by one or more computing models used for generating customized media content in accordance with one or more example embodiments of the disclosure.

FIG. 2 depicts example outputs generated by one or more computing models used for generating customized media content. For example, FIG. 2 shows a text-based narrative 202 (which may be similar to the text-based narrative 140 shown in FIG. 1B) and one or more video frames 204 (which may be similar to the one or more video frames 142 shown in FIG. 1B).

In embodiments, the text-based narrative 202 may be produced by a first model of the one or more computing models. For example, the first model may be a large language model or any other type of model capable of producing such outputs. The text-based narrative 202 may include different elements that may be implemented in the customized media content. For example, the text-based narrative 202 may include action lines that describe visuals that are presented in the customized media content. The text-based narrative 202 may also include text intended to be included within a voiceover of the customized media content. In some instances, the contents of this text may be converted into an artificial-intelligence voiceover to be spoken during the customized media content. However, the voiceover may also be manually produced using a human voice actor as well. The text-based narrative 202 may also include text to be superimposed over the video frames included in the customized media content as well. The text-based narrative 202 may also include any other types of text that may be used to generate the customized media content as well.

In embodiments, the one or more video frames 204 may be produced by a first model of the one or more computing models. For example, the second model may be a large multimodal visual model or any other type of model capable of producing such outputs. The one or more video frames 204 may be video frames obtained from the media content on which the customized media content is based. For example, if the customized media content is a season recap for a television show, the one or more video frames 204 may include video frames from episodes of the television show. The text-based narrative 202 produced by the first model may be provided as an input to the second model, and the second model may identify the particular video frames to select based on the contents of the text-based narrative 202. In some instances, the second model may identify the video frames to select based on the action lines included within the text-based narrative. For example, if the text-based narrative 202 includes an action line stating "dramatic music plays as the camera pans across the Washington, D.C. skyline," then the second model may identify video frames including similar visual elements to select.

In embodiments, the second model may identify individual video frames or groups of video frames that may not necessarily include all of the video frames included within the associated camera shot, scene etc. Once the second model identifies video frames deemed to be relevant to the text-based narrative, the media content segments produced by a third model (for example, the shot detection model as described herein) may be leveraged and the video frames within those segments may be compared to the video frames identified by the second model. Accordingly, an entire segment including a given camera shot or scene may be used to generate the customized media content.

While in some instances the text-based narrative 202 and the one or more video frames 204 individually may not be presented to a user (that is, only the final customized media content is shown to the user), in embodiments, editing capabilities may also be provided to a user. For example, the text-based narrative 202, one or more video frames 204, and/or any other individual elements used to generate the customized media content may be presented to a user for potential editing before the final customized media content is generated. The user may then be able to make edits to the text-based narrative 202, the one or more video frames 204, or other elements to alter the final customized media content that is generated. For example, the action line "dramatic music plays as the camera pans across the Washington, D.C. skyline" may be edited to state "dramatic music plays as the camera pans across the Paris skyline." Based on this edit, the second model may identify video frames showing the Paris skyline rather than the Washington, D.C., skyline.

The editing capabilities are not necessarily only limited to the text-based narrative 202. For example, the user 122 may also be able to interact with the one or more video frames 142. For example, the user 142 may delete or re-arrange some or all of the video frames. The user 122 may also manually add additional video frames that are not included in the original set of video frames produced by the one or more computing model(s) 102.

Figure 3B:
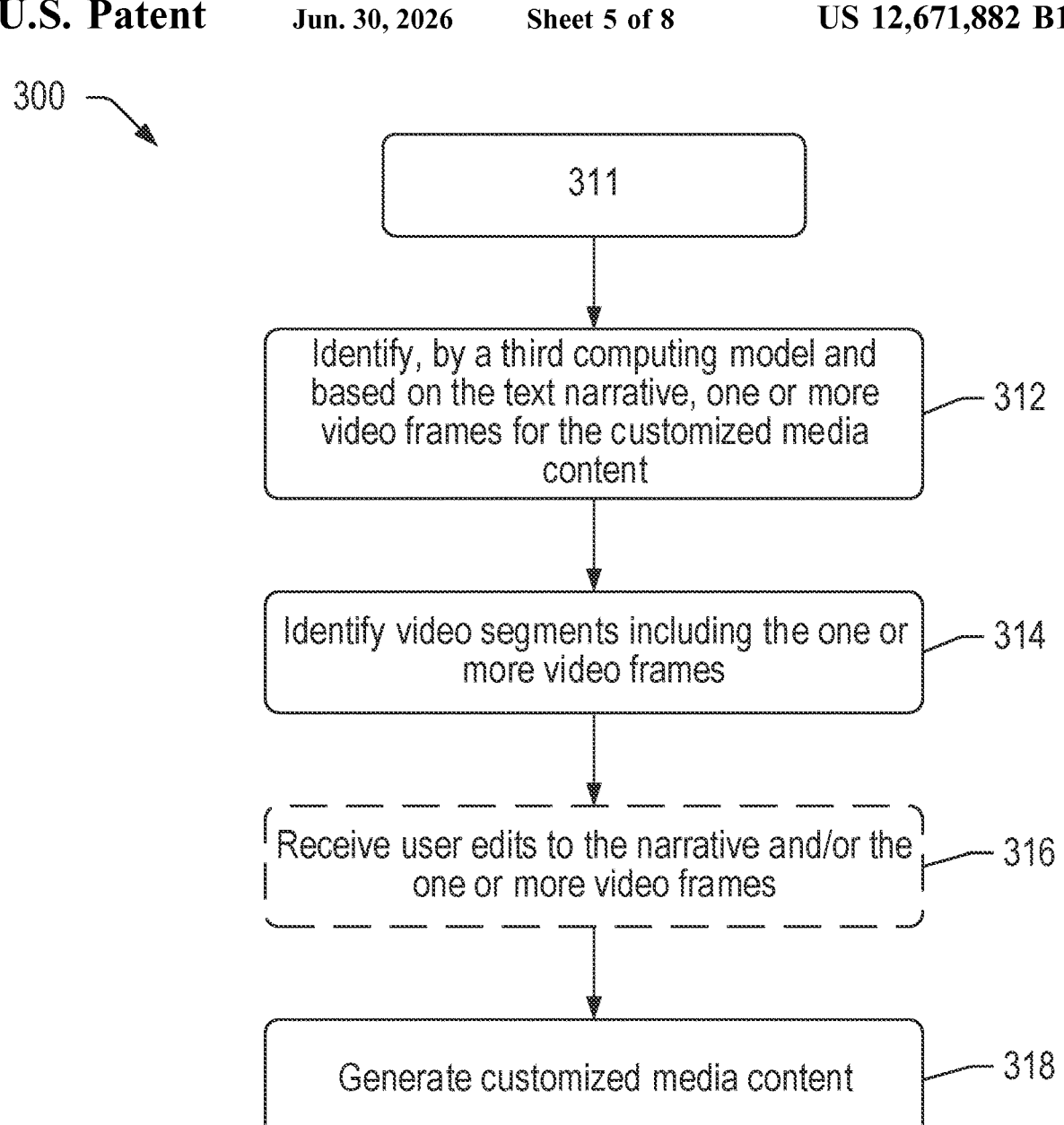

FIGS. 3A-3B is a flow diagram 300 illustrating example operations associated with generating customized media content. "Media" content may refer to any type of content, such as media content, audio content, a combination of video and audio content, etc. Additionally, any reference to "video" content is not intended to be limiting herein and may also refer to any other type of content (such as a combination of video and audio content, audio-only content, etc.). Particularly, the flow diagram 300 provides a more comprehensive description of the operations involved in generating the customized media content.

The flow diagram 300 begins with operation 302, which involves training one or more computing model(s). The one or more computing model(s) may include any models described herein. Before the one or more computing model(s) are used in real-time to generate customized media content, the one or more computing model(s) may be pre-trained using some or all of the media content that pre-exists within a content system. In this manner, when customized media content is generated in real-time using the one or more computing model(s), the one or more computing model(s) may already be trained with the contents of the existing media content.

Operation 304 involves generating, using the first computing model, video segments for the existing media content. As described with respect to FIG. 3A, the "first" computing model may be the shot detection model described herein (as aforementioned, reference to a "first," "second," or "third" model may not necessarily always consistently refer to the same model, but rather may be used to distinguish individual models). The shot detection model may identify locations within existing media content at which the camera shots change and may separate the media content into smaller segments based on these shot changes. The segments may not necessarily be limited to changes in camera shots. For example, the shot detection model may also produce media content segments for each of the distinct scenes within the television show as well (and/or may produce media content segments based on any other types of criteria).

These video segments may also be generated prior to the real-time generation of customized media content such that video segments that may be used in the customized media content may already be available to reduce latency in generating the customized media content. However, in some instances, some or all of the video segmentation may be performed in real-time as the customized media content is generated as well.

Operations 306 and 308 involve receiving an input triggering the generation of customized media content. The generation of customized media content may be triggered based on any number of manual user inputs or automated inputs. As an example, operation 306 involves receiving a text-based or voice query for customized media content. The text-based query may be received by the content system as a manual input provided by the user. For example, the user may enter a string indicating "show me a season recap for television show 1 showing action scenes." Alternatively, the use may provide a similar input as a voice input. For example, the user may speak the same phrase "show me a season recap for television show 1 showing action scenes" and the voice input may be detected by a device used by the user to access the content system (such as a desktop or laptop computer, tablet, smart television, etc.). The manual input may also be provided in any other number of suitable ways, such as selection of a button, selection of an element from a dropdown menu, etc.

The manual input may be provided by the user to a device, such as device 124 shown in FIG. 1A, user device 501, and/or any other type of device described herein or otherwise. For example, the user may be browsing a content system using their smartphone or desktop or laptop computer, and may provide the manual input through the smartphone or desktop or laptop computer (or any other type of device).

As another example, operation 308 involves an automated input for triggering the generation of customized media content. That is, the customized media content may not necessarily require a manual input from the user for the customized media content to be generated. Instead, the customized media content may be generated based on historical data associated with the user. As the user views media content on the content system, data about the viewing preferences of the user may be obtained (for example, the typical genre of media content that the user watches and/or any other types of relevant data). The customized media content may also be automatically generated based on any other data beyond user historical data as well.

The customized media content may automatically be generated using this data in a number of different circumstances. For example, if the historical data indicates that the user has watched the first season of a television show and a second season is about to be released on the content system, then the one or more models may automatically generate a season recap for season one of the television show that the user may view on the content system before viewing the second season. As another example, if a new movie is released on the content system, customized trailers for individual users that have watched movies of similar genres in the past may be generated and added. When the users open the content system, the trailer may be presented to the users (or may otherwise be made available on the content system for the users to watch). In some instances, the customized trailers may be generated for all users of the content system as well. These are merely non-limiting examples of scenarios in which customized content may be automatically generated and is are not intended to be limiting.

Additionally, in embodiments, a combination of manual input and historical data associated with the user may be used in the generation of the customized media content. For example, the user may still provide the text-based query (or other type of query), but the historical data associated with the user may still be leveraged to further tailor the customized media content that is generated to the preferences of the user. For example, the user may provide a voice command "show me a season recap for season one of 'television show A.'" The system may leverage historical data associated with the user to generate the customized season recap for the television show. The historical data may also be used to address scenarios where minimal information is provided by the user in the manual request. Continuing the above example, the user did not provide an indication of any of the customized elements to be included in the season recap (for example, if the user desires action scenes, certain characters, plot points, etc.). The historical data may be leveraged to determine in which manner the season recap should be customized for the user. In embodiments, any of the one or more computing model(s) described herein (or any other model) may be leveraged to make such determinations, for example.

Operation 309 involves identifying relevant content. That is, in embodiments, rather than the one or more computing models considering all media content of the media system when generating the customized media content, the one or more computer models may filter the content and only consider media content that is relevant to the customized media content. For example, if a user input provided in accordance with operation 306 indicates a request for a season recap for a specific television show, the one or more computing models may only consider media content associated with that television show rather than considering all of the media content on the content system. The filtering may be performed in any number of suitable manners, such as using a title of the television show, etc. This may serve a number of purposes, such as reducing latency and processing power requirements for producing the customized media content.

Operation 310 involves producing, by a second computing model, a narrative for the customized media content. In embodiments, the narrative may be a text-based narrative, such as the narrative shown in FIG. 2. However, this is not intended to be limiting any the narrative may not necessarily be text-based. Any reference to a "text-based narrative" herein is merely exemplary and may also include any other type of narrative, as well.

The narrative may include different elements that may be implemented in the customized media content. For example, the text-based narrative may include action lines that describe visuals that are presented in the customized media content. The narrative may also include text intended to be included within a voiceover of the customized media content. In some instances, the contents of this text may be converted into an artificial-intelligence voiceover to be spoken during the customized media content. However, the voiceover may also be manually produced using a human voice actor as well. The narrative may also include text to be superimposed over the video frames included in the customized media content as well. The narrative may also include any other types of text that may be used to generate the customized media content as well.

Operation 311 involves performing customized content verification. In embodiments, the verification may be performed before the customized media content is generated. However, the verification may also be performed at any other time, such as after the customized media content is generated. For example, the verification may be performed before and/or after the narrative and one or more video frames are combined or "stitched together" to generate the customized media content. This verification may involve determining if any of the outputs of the one or more computing models (such as the narrative, the one or more video frames, the customized media content itself, etc.) is relevant to the request for customized media content of operation 306 (or the automated initiation of the process to generate the customized media content of operation 308).

In embodiments, the verification may also involve verifying that the customized media content satisfies one or more pre-defined rules. For example, if the customized media content is a trailer for a movie, it may be undesirable to present "spoilers" for certain portions of the movie. Thus, one or more rules may exist that provide an indication of portions of the movie that should not be included in the trailer.

In embodiments, the rules may differ based on any number of factors. For example, the applicable rules may vary by region. Some geographical regions may have different rules for types of content that would be censored for users. For example, a first region may censor violent content, whereas a second region may not provide the same censors. As another example, rules for one user may be different than rules for another one. For example, a first user may establish parental controls indicating that violent or sexual content should not be presented to a child accessing the content system via a child account. As another example, a first user may indicate a desire to not view violent content, but a second user may view such content. A rule may be created for the first user (either based on a manual user input or automatically generated based on historical data associated with the first user) by which violent content is filtered from any customized media content produced for that user. However, such content may be included in customized media content for the second user given that the second user views violent content. As yet another example, the rules may include age restrictions where certain types of content may not be presented to viewers below a threshold age.

These rules are merely exemplary and any other number of rules may also be established and considered when generating the customized media content. The rules may be established manually or automatically by any user, device, system, etc., such as the user viewing the content, the content system, an entity associated with the content system, etc.

Operation 312 involves identifying, by a third computing model and based on the text-based narrative, one or more video frames for the customized media content. Operation 314 involves identifying video segments including the one or more video frames.

Optional operation 316 involves receiving user edits to the text-based narrative and/or the one or more video frames. In some instances, the narrative and/or the video frames produced by the one or more model(s) may be presented to the user via a user interface (such as is shown in FIG. 2, for example). The user may manually edit any of the text included in the narrative to make changes as desired (or may make any other types of edits depending on the format of the narrative). Additionally, in some instances, the manual edits to the narrative may cause the one or more model(s) to modify the customized content. For example, the action line "dramatic music plays as the camera pans across the Washington, D.C. skyline" may be edited to state "dramatic music plays as the camera pans across the Paris skyline." Based on this edit, the second model may identify video frames showing the Paris skyline rather than the Washington, D.C., skyline.

Operation 318 involves generating the customized media content. The customized media content may be generated by combining or all of the text-based narrative, the one or more video frames (or the one or more video segments associated with the one or more video frames), and any other elements associated with the customized media content (e.g., the generated voiceover, etc.). The customized media content may then be stored (for example, within database 510 or in any other storage location). The customized media content may then be presented to the user via the content system.

FIG. 4 depicts an example method 400 for generating customized media content. Some or all of the blocks of the process flows or methods in this disclosure may be performed in a distributed manner across any number of devices or systems (for example, etc.). The operations of the method 400 may be optional and may be performed in a different order.

At block 410 of the method 400, computer-executable instructions stored on a memory of a system or device, such as user device 501, remote system 620, computing devices 504, 508, and/or 600, etc., may be executed to train one or more computing models using a set of media content. At block 420 of the method 400, computer-executable instructions stored on a memory of a system or device may be executed to receive, using one or more processors, a first input associated with a first user, the first input being indicative of first customized media content to be generated based on at least a first subset of the set of media content. At block 430 of the method 400, computer-executable instructions stored on a memory of a system or device may be executed to generate, by the one or more computing models and based on the first input, a first narrative. In some embodiments, the narrative may be a text-based narrative as illustrated in FIG. 2, however, the narrative may also be provided as an output in any other format as well. At block 440 of the method 400, computer-executable instructions stored on a memory of a system or device may be executed to identify, by the one or more computing models and based on the first narrative, one or more first video frames of the set of media content. At block 450 of the method 400, computer-executable instructions stored on a memory of a system or device may be executed to generate, by the one or more computing models, the first customized media content using the first narrative and the one or more first video frames.

In embodiments, the method 400 may further include receiving, using the one or more processors, a second input associated with a second user, the second input being indicative of second customized media content to be generated based on the first subset of the set of media content.

The method 400 may further include generating, by the one or more computing models and based on the second input, a second text-based narrative. The method 400 may further include identifying, by the one or more computing models and based on the second text-based narrative, one or more second video frames of the set of media content. The method 400 may further include generating, by the one or more computing models, the second customized media content using the second text-based narrative and the one or more second video frames, wherein the second customized media content is different than the first customized media content.

In embodiments, the one or more computing models include a first computing model and a second computing model, wherein the first computing model generates the first text-based narrative, wherein the second computing model receives the first text-based narrative as an input, and wherein the second computing model identifies the one or more first video frames.

In embodiments, the method 400 may further include generating, using the one or more computing models, a first video segment and a second video segment for first media content of the set of media content. The method 400 may further include determining, using the one or more computing models, that a first video frame of the one or more first video frames is included within the first video segment, wherein the first customized media content includes the first video segment instead of the second video segment based on the determination that the first video frame is included within the first video segment.

In embodiments, the method 400 may further include generating, using artificial intelligence, a voiceover based on the first text-based narrative, wherein the first customized media content includes the voiceover.

In embodiments, the first input is a text-based or voice query received from a user device. In embodiments, the first input is historical data associated with the first user. Additionally, in embodiments, the one or more computing models comprise at least one of: a large language model, a large multimodal visual model, and a shot detection model.

Figure 5:
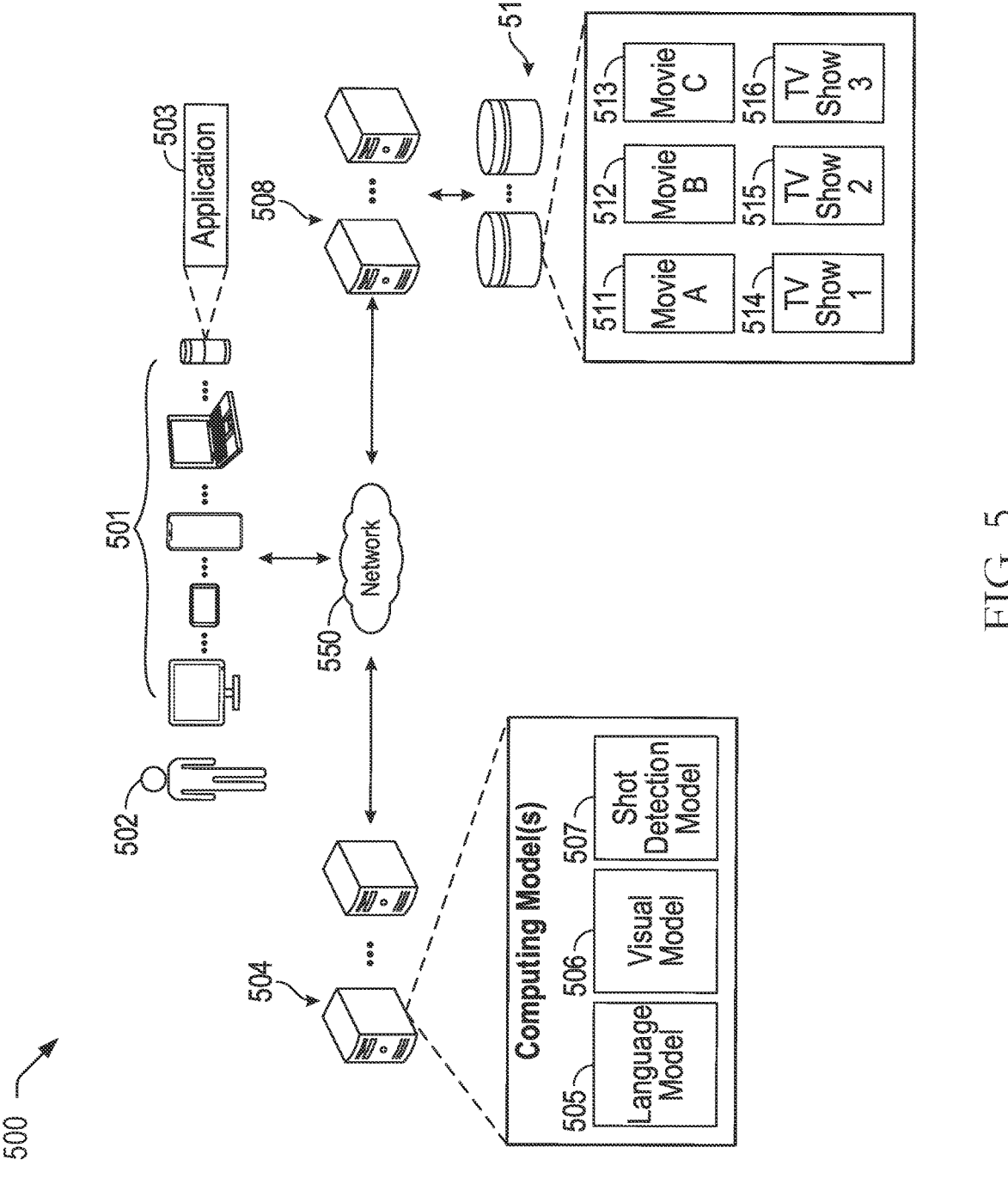
FIG. 5 depicts an example system for generating customized media content in accordance with one or more example embodiments of the disclosure.

FIG. 5 is an example system 500 for generating customized media content. In one or more embodiments, the system may include one or more user devices 501 (which may be associated with one or more users 502), one or more computing devices (for example, computing devices 504 and 508), and/or one or more databases 510. However, these components of the system 500 are merely exemplary and are not intended to be limiting in any way. For simplicity, reference may be made hereinafter to a user device 501, computing device 504 and/or 508, database 510, etc., however, this is not intended to be limiting and may still refer to any number of such elements.

The user device 501 may be any type of device, such as a smartphone, desktop computer, laptop computer, tablet, smart television (for example, a television with Internet connectivity, the capability to install applications, etc.), and/or any other type of device. The user device 501 may include an application 503 that may allow a user 502 to perform certain functions described herein. That is, the application 503 may allow the user to access the content system hosted on the computing device 508 to view media content provided by the content system (such as movies 511-513, television shows 514-516, and/or any other types of media content. For example, the user 502 may have a user account with the content system and may log into the user account to stream movie 511 for viewing on the user device 501. Similarly, the application 503 may allow the user 502 to view any customized media content that is generated by the computing device 504 using the one or more computing model(s) (such as the first model 505, second model 506, and third model 507).

The user device 501 may also be configured to receive text or voice-based queries from the user 502 for generating customized media content (in instances in which manual inputs are received to trigger the generation of the content). For example, the user 502 may input a text query into the application 503 requesting a recap of a season for a television show being watched by the user 502. Similarly, the user 502 may provide the query as a voice input and/or may provide any other type of manual input indicative of a desire to view particular customized content. However, as aforementioned, the customized media content may also be automatically generated without requiring user input as well.

The computing device 504 may be any type of device (such as a local or remote server for example) used to perform any of the processing described herein. The computing device 504 may host the one or more computing model(s), such as the first model 505, second model 506, third model 507, and/or any other number of model(s) leveraged herein to generate the customized media content. The computing model(s) may be any type of model, such as artificial intelligence, machine learning, etc.

In embodiments, the one or more model(s) may be pre-trained based on the existing media content associated with the content system (for example, media content shown as being stored within database 510, as well as any other media content). That is, before the model(s) are leveraged in real-time to generate customized media content for the user 502, the one or more model(s) may be trained using the existing media content such that the one or more model(s) have knowledge of the existing media content before being leveraged in real-time.

Additionally, the one or more model(s) may continuously be trained based on new data that is received. For example, the one or more model(s) may be trained using media content that is added to the content system. The one or more model(s) may also be trained using any other types of data, such as user preferences, etc.

A feedback mechanism may also exist to further refine the one or more model(s). For example, when customized media content is generated using the one or more model(s), the user 502 may provide feedback relating to the customized media content. After viewing customized media content, the user 502 may provide manual feedback through the application 503. For example, the user 502 may provide a numerical value indicating how successful the customized media content was in engaging the user 502. The feedback mechanism may also be automated and may not require manual user feedback as well. For example, various metrics may automatically be collected by the computing devices 504 and/or 508, such as if the user 502 viewed the customized media content, if the user 502 viewed the entirety of the customized media content, if the user 502 viewed the associated media content after viewing the customized media content (for example, if the customized media content is a trailer for a movie, if the user 502 then viewed the movie after watching the trailer), etc. This data may be used to re-train the one or more model(s) to refine the one or more model(s) to produce more effective customized media content for a particular user.

In embodiments, the first model 505 may be a model used to produce a text-based narrative associated with the customized media content. That is, the first model 505 may receive an input, such as a text-based query or voice query from the user 502 (such as "show me a trailer for Movie A with action scenes"). The first model 505 may also receive an automated input, such as historical data associated with the user 502. The first model 505 may process this input to produce a text-based narrative for customized media content based on the input. An example of a text-based narrative that may be output by the first model 505 is provided in FIG. 2. In some instances, the first model 505 may be a large language model. A large language model may include a type of deep learning architecture called transformer networks. A transformer model is a neural network that learns context and meaning by tracking relationships in sequential data, like the words in a sentence. However, any other type of model may be used to produce the text-based narratives for the customized media content.

The second model 506 may be a model used to determine one or more video frames of the existing media content to be included in the customized media content. The second model 506 may receive the text-based narrative produced by the first model 505 as an input. The second model 506 may process the text-based narrative to identify one or more video frames of the existing media content to include in the customized media content. For example, if the manual query from the user 502 (or automated input) is to generate a trailer for Movie A, then the second model 506 may identify video frames within Movie A to add to the trailer based on the narrative produced by the first model 505. An example of a collection of identified video frames is also shown in FIG. 2. In some instances, the second model 506 may be a large multimodal visual model. A large multimodal visual model may also include a type of deep learning architecture. However, any other type of model may be used to identify the one or more video frames for the customized media content.

The third model 507 may be a shot detection model that is used to separate the media content in database 510 into segments. Continuing the example, the third model 507 may identify locations within the Movie A at which the camera shots change and may produce distinct video segments including video frames associated with each of the distinct camera shots for Movie A. For example, if Movie A is a crime mystery movie, the third model 507 may generate a first video segment in which a detective is shown driving to a crime scene and a second video segment in which the camera shot changes to show a police officer at the crime scene having a conversation with the detective. The video segments may not necessarily be limited to changes in camera shots. For example, the third model 507 may also produce media content segments for each of the distinct scenes within the television show as well (and/or may produce media content segments based on any other types of criteria).

In embodiments, once the second model 506 identifies video frames deemed to be relevant to the text-based narrative, the media content segments produced by the third model 507 may be leveraged and the video frames within those segments may be compared to the video frames identified by the second model 506. Accordingly, an entire video segment including a given camera shot or scene may be used to generate the customized media content.

The computing device 508 may host the content system associated with the media content (or other types of content) that the user 502 may access via the user device 501 (as well as any generated customized content). In embodiments, the computing model(s) and the content system may also be hosted on the same computing device, rather than requiring multiple computing devices, as well. For example, the content system may also be hosted on the computing device 504.

The database 510 may store any of the data that is used as described herein. For example, the database 510 may store any of the media content associated with the content system, including any customized media content (such as trailers and recaps) that are generated by the one or more computing model(s) hosted on the computing device 504. The database 510 may also store other types of relevant data, including historical data associated with the user 502, such that the customized media content may be automatically generated without requiring a manual user input by the user 502. For example, if the historical data indicates that the user 502 often views media content in the action genre and that a new season has been released for a television show that the user 502 has previously watched, then the computing device 504 may leverage the one or more computing model(s) to generate a season recap for the prior season of the television show that is tailored to the user 502 (for example, primarily includes action scenes). Different types of customized media content may be generated depending on the particular user. For example, a season recap for the same television show may be different for a different user depending on the preferences of that user.

In one or more embodiments, any of the elements of the system 500 (for example, one or more user devices 501, one or more computing devices 504 and 508, one or more databases 510, and/or any other element described with respect to FIG. 5 or otherwise) may be configured to communicate via a communications network 550. The communications network 550 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, the communications network 550 may have any suitable communication range associated therewith and may include, for example, global networks (e.g., the Internet), metropolitan area networks (MANs), wide area networks (WANs), local area networks (LANs), or personal area networks (PANs). In addition, communications network 550 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Finally, any of the elements (for example, one or more user devices 501, one or more computing devices 504 and 508, and/or one or more databases 510) of the system 500 may include any of the elements of the computing device 600 as well (such as the processor 602, memory 604, etc.).

Figure 6:
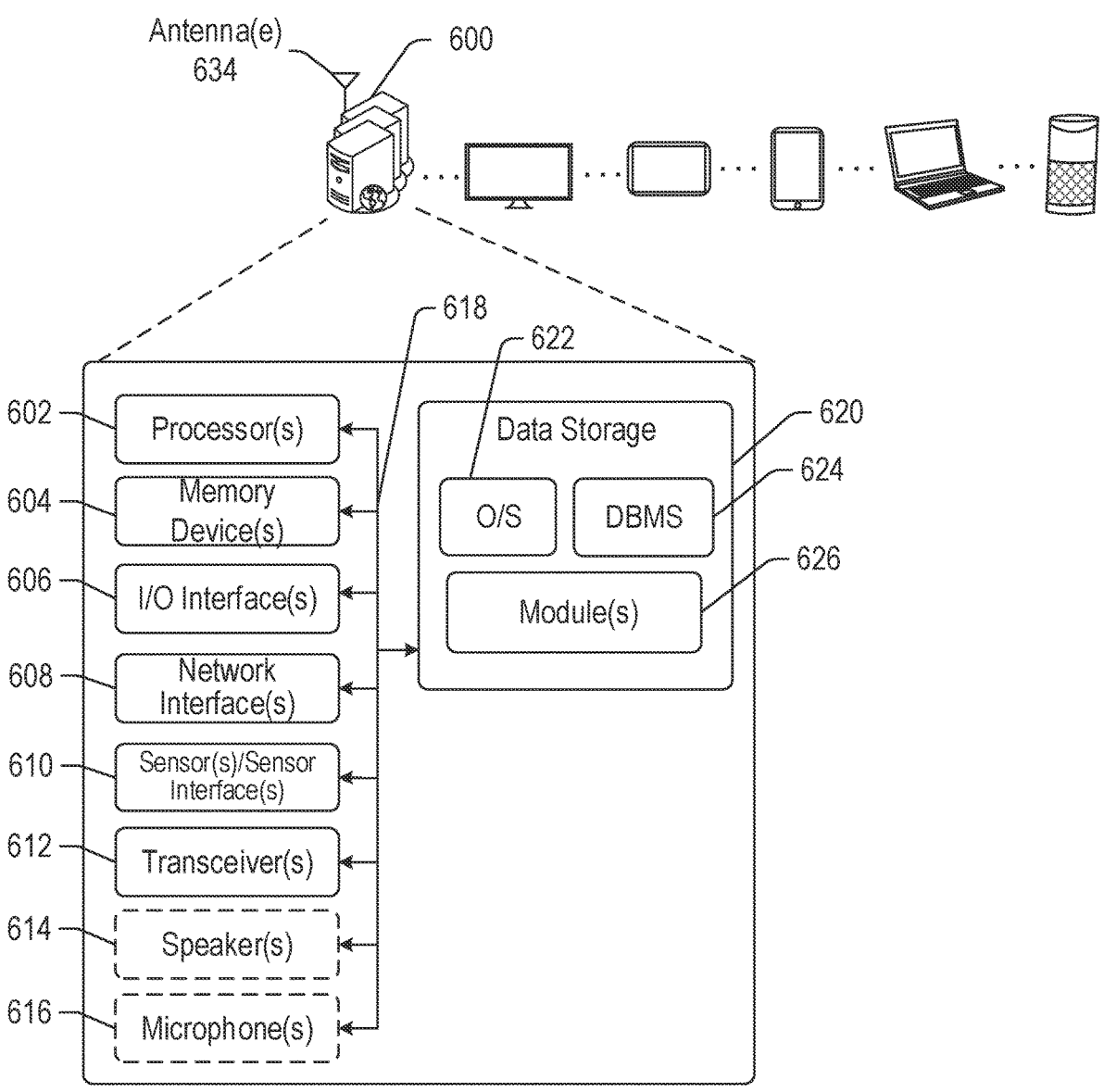
FIG. 6 depicts an example computing device in accordance with one or more example embodiments of the disclosure.

FIG. 6 is a schematic block diagram of an illustrative computing device 600 in accordance with one or more example embodiments of the disclosure. The computing device 600 may include any suitable computing device capable of receiving and/or generating data including, but not limited to, a user device such as a smartphone, tablet, e-reader, wearable device, or the like; a desktop computer; a laptop computer; a content streaming device; a set-top box; or the like. The computing device 600 may correspond to an illustrative device configuration for the devices of FIGS. 1-5 (such as the user device 501 and computing devices 504 and 508, for example.

The computing device 600 may be configured to communicate via one or more networks with one or more servers, search engines, user devices, or the like. In some embodiments, a single remote server or single group of remote servers may be configured to perform more than one type of content rating and/or machine learning functionality.

Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computing device 600 may include one or more processors (processor(s)) 602, one or more memory devices 604 (generically referred to herein as memory 604), one or more input/output (I/O) interface(s) 606, one or more network interface(s) 608, one or more sensors or sensor interface(s) 610, one or more transceivers 612, one or more optional speakers 614, one or more optional microphones 616, and data storage 620. The computing device 600 may further include one or more buses 618 that functionally couple various components of the computing device 600. The computing device 600 may further include one or more antenna(e) 634 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 618 may include at least one of a system bus, a memory bus, an address bus, or a message bus, and may permit exchange of information (e.g., data (including computer-executable code), signaling, etc.) between various components of the computing device 600. The bus(es) 618 may include, without limitation, a memory bus or a memory controller, a peripheral bus, an accelerated graphics port, and so forth. The bus(es) 618 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 604 of the computing device 600 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 604 may include multiple different types of memory such as various types of static random access memory (SRAM), various types of dynamic random access memory (DRAM), various types of unalterable ROM, and/or writeable variants of ROM such as electrically erasable programmable read-only memory (EE-PROM), flash memory, and so forth. The memory 604 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 620 may include removable storage and/or non-removable storage including, but not limited to, magnetic storage, optical disk storage, and/or tape storage. The data storage 620 may provide non-volatile storage of computer-executable instructions and other data. The memory 604 and the data storage 620, removable and/or non-removable, are examples of computer-readable storage media (CRSM) as that term is used herein.

The data storage 620 may store computer-executable code, instructions, or the like that may be loadable into the memory 604 and executable by the processor(s) 602 to cause the processor(s) 602 to perform or initiate various operations. The data storage 620 may additionally store data that may be copied to memory 604 for use by the processor(s) 602 during the execution of the computer-executable instructions. Moreover, output data generated as a result of execution of the computer-executable instructions by the processor(s) 602 may be stored initially in memory 604, and may ultimately be copied to data storage 620 for non-volatile storage.

More specifically, the data storage 620 may store one or more operating systems (O/S) 622; one or more database management systems (DBMS) 624; and one or more program module(s), applications, engines, computer-executable code, scripts, or the like such as, for example, one or more module(s) 626. Any of the components depicted as being stored in data storage 620 may include any combination of software, firmware, and/or hardware. The software and/or firmware may include computer-executable code, instructions, or the like that may be loaded into the memory 604 for execution by one or more of the processor(s) 602. Any of the components depicted as being stored in data storage 620 may support functionality described in reference to correspondingly named components earlier in this disclosure.

The data storage 620 may further store various types of data utilized by components of the computing device 600. Any data stored in the data storage 620 may be loaded into the memory 604 for use by the processor(s) 602 in executing computer-executable code. In addition, any data depicted as being stored in the data storage 620 may potentially be stored in one or more datastore(s) and may be accessed via the DBMS 624 and loaded in the memory 604 for use by the processor(s) 602 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 6, the datastore(s) may include, for example, purchase history information, user action information, user profile information, a database linking search queries and user actions, and other information.

The processor(s) 602 may be configured to access the memory 604 and execute computer-executable instructions loaded therein. For example, the processor(s) 602 may be configured to execute computer-executable instructions of the various program module(s), applications, engines, or the like of the computing device 600 to cause or facilitate various operations to be performed in accordance with one or more embodiments of the disclosure. The processor(s) 602 may include any suitable processing unit capable of accepting data as input, processing the input data in accordance with stored computer-executable instructions, and generating output data. The processor(s) 602 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 602 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 602 may be capable of supporting any of a variety of instruction sets.

Referring now to functionality supported by the various program module(s) depicted in FIG. 6, the module(s) 626 may include computer-executable instructions, code, or the like that responsive to execution by one or more of the processor(s) 602 may perform functions including, but not limited to, performing any functionality associated with the generation of customized content as described herein, including any of the functionality of the one or more computing model(s).

Referring now to other illustrative components depicted as being stored in the data storage 620, the O/S 622 may be loaded from the data storage 620 into the memory 604 and may provide an interface between other application software executing on the computing device 600 and hardware resources of the computing device 600. More specifically, the O/S 622 may include a set of computer-executable instructions for managing hardware resources of the computing device 600 and for providing common services to other application programs (e.g., managing memory allocation among various application programs). In certain example embodiments, the O/S 622 may control execution of the other program module(s) to dynamically enhance characters for content rendering. The O/S 622 may include any operating system now known or which may be developed in the future including, but not limited to, any server operating system, any mainframe operating system, or any other proprietary or non-proprietary operating system.

The DBMS 624 may be loaded into the memory 604 and may support functionality for accessing, retrieving, storing, and/or manipulating data stored in the memory 604 and/or data stored in the data storage 620. The DBMS 624 may use any of a variety of database models (e.g., relational model, object model, etc.) and may support any of a variety of query languages. The DBMS 624 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the computing device 600 is a user device, the DBMS 624 may be any suitable light-weight DBMS optimized for performance on a user device.

Referring now to other illustrative components of the computing device 600, the input/output (I/O) interface(s) 606 may facilitate the receipt of input information by the computing device 600 from one or more I/O devices as well as the output of information from the computing device 600 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computing device 600 or may be separate. The I/O devices may further include, for example, any number of peripheral devices such as data storage devices, printing devices, and so forth.

The I/O interface(s) 606 may also include an interface for an external peripheral device connection such as universal serial bus (USB), FireWire, Thunderbolt, Ethernet port or other connection protocol that may connect to one or more networks. The I/O interface(s) 606 may also include a connection to one or more of the antenna(e) 634 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, ZigBee network, etc.

The computing device 600 may further include one or more network interface(s) 608 via which the computing device 600 may communicate with any of a variety of other systems, platforms, networks, devices, and so forth. The network interface(s) 608 may enable communication, for example, with one or more wireless routers, one or more host servers, one or more web servers, and the like via one or more of networks.

The antenna(e) 634 may include any suitable type of antenna depending, for example, on the communications protocols used to transmit or receive signals via the antenna(e) 634. Non-limiting examples of suitable antennas may include directional antennas, non-directional antennas, dipole antennas, folded dipole antennas, patch antennas, multiple-input multiple-output (MIMO) antennas, or the like. The antenna(e) 634 may be communicatively coupled to one or more transceivers 612 or radio components to which or from which signals may be transmitted or received.

As previously described, the antenna(e) 634 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 634 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 634 may be configured to transmit or receive radio frequency signals within any suitable frequency range forming part of the unlicensed portion of the radio spectrum.

The antenna(e) 634 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 612 may include any suitable radio component(s) for—in cooperation with the antenna(e) 634—transmitting or receiving radio frequency (RF) signals in the bandwidth and/or channels corresponding to the communications protocols utilized by the computing device 600 to communicate with other devices. The transceiver(s) 612 may include hardware, software, and/or firmware for modulating, transmitting, or receiving—potentially in cooperation with any of antenna(e) 634—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 612 may further include hardware, firmware, or software for receiving GNSS signals. The transceiver(s) 612 may include any known receiver and baseband suitable for communicating via the communications protocols utilized by the computing device 600. The transceiver(s) 612 may further include a low noise amplifier (LNA), additional signal amplifiers, an analog-to-digital (A/D) converter, one or more buffers, a digital baseband, or the like.

The sensor(s)/sensor interface(s) 610 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

The optional speaker(s) 614 may be any device configured to generate audible sound. The optional microphone(s) 616 may be any device configured to receive analog sound input or voice data.

It should be appreciated that the program module(s), applications, computer-executable instructions, code, or the like depicted in FIG. 6 as being stored in the data storage 620 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the computing device 600, and/or hosted on other computing device(s)

accessible via one or more networks, may be provided to support functionality provided by the program module(s), applications, or computer-executable code depicted in FIG. 6 and/or additional or alternate functionality. Further, functionality may be modularized differently such that processing described as being supported collectively by the collection of program module(s) depicted in FIG. 6 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 6 may be implemented, at least partially, in hardware and/or firmware across any number of devices.

It should further be appreciated that the computing device 600 may include alternate and/or additional hardware, software, or firmware components beyond those described or depicted without departing from the scope of the disclosure. More particularly, it should be appreciated that software, firmware, or hardware components depicted as forming part of the computing device 600 are merely illustrative and that some components may not be present or additional components may be provided in various embodiments. While various illustrative program module(s) have been depicted and described as software module(s) stored in data storage 620, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method comprising:

training one or more machine learning models using a set of media content stored in memory, the set of media content including at least: one or more movies and one or more televisions shows;

generating, using a first machine learning model, a plurality of video segments of the set of media content;

receiving, using one or more processors, a first input associated with a first user, the first input being a natural language input that is indicative of first customized media content to be generated based on at least a first movie or first television show of the set of media content, wherein the first input includes at least one of: a text-based or voice query received from a user device and historical data associated with the first user, and wherein the first customized media content includes a custom trailer or recap for the first movie or first television show;

generating, by a second machine learning model and based on the first input, a first text-based narrative associated with the first movie or first television show;

receiving, by a third machine learning model, the first text-based narrative, wherein the first text-based narrative comprises at least some unique text that differs from text included in an existing text-based narrative of the media content and is based on the natural language input instead of the existing text-based narrative of the first movie or first television show;

identifying, by the third machine learning model and based on the first text-based narrative, one or more first video frames of the first movie or first television show;

identifying, by the third machine learning model, one or more video segments of the plurality of video segments that includes the one or more first video frames; and generating, by the one or more machine learning models, the first customized media content using the first text-based narrative and the one or more video segments, wherein the first machine learning model, second machine learning model, and third machine learning model are different models.

2. The method of claim 1, further comprising:

receiving a second input associated with a second user, the second input being indicative of second customized media content to be generated based on the first movie or first television show;

generating, by the second machine learning model and based on the second input, a second text-based narrative;

identifying, by the third machine learning model and based on the second text-based narrative, one or more second video frames of the set of media content; and generating, by the one or more machine learning models, the second customized media content using the second text-based narrative and the one or more second video frames, wherein the second customized media content is different than the first customized media content, and wherein the second customized media content is tailored to the second user.

3. The method of claim 1, further comprising:

generating a computer-generated voiceover based on the first text-based narrative, wherein the first customized media content includes the computer-generated voiceover.

4. The method of claim 1, wherein the machine learning models comprise at least one of: a large language model, a large multimodal visual model, and a shot detection model.

5. A method comprising:

receiving, using one or more processors, a first input associated with a first user, the first input being a natural language input that is indicative of first customized media content to be generated for first media content;

generating, by a first machine learning model and based on the first input, a first text-based narrative for the first customized media content, wherein the first text-based narrative comprises at least some unique text that differs from text included in an existing text-based narrative of the first media content and is based on the natural language input instead of the existing text-based narrative of the first media content;

identifying, by a second machine learning model and based on the first text-based narrative, one or more first video frames of the first media content; and generating the first customized media content using the first text-based narrative and the one or more first video frames, wherein the first machine learning model and second machine learning model are different models.

6. The method of claim 5, further comprising:

receiving, using the one or more processors, a second input associated with a second user, the second input being indicative of second customized media content to be generated based on the first media content;

generating, by the first machine learning model and based on the second input, a second text-based narrative;

identifying, by the second machine learning model and based on the second text-based narrative, one or more second video frames of the first media content; and generating the second customized media content using the second text-based narrative and the one or more second video frames, wherein the second customized media content is different than the first customized media content.

7. The method of claim 5, further comprising:

generating a first video segment and a second video segment for first media content of the first media content; and determining that a first video frame of the one or more first video frames is included within the first video segment, wherein the first customized media content includes the first video segment instead of the second video segment based on the determination that the first video frame is included within the first video segment.

8. The method of claim 5, further comprising:

generating, a computer-generated voiceover based on the first text-based narrative, wherein the first customized media content includes the computer-generated voiceover.

9. The method of claim 5, wherein the first input is a text-based or voice query received from a user device.

10. The method of claim 5, wherein the first input is historical data associated with the first user.

11. The method of claim 5, further comprising:

training one or more computing models using a set of media content.

12. A system comprising:

memory that stores computer-executable instructions; and one or more processors configured to access the memory and execute the computer-executable instructions to:

receive, using one or more processors, a first input associated with a first user, the first input being a natural language input that is indicative of first customized media content to be generated for first media content;

generate, by a first machine learning model and based on the first input, a first text-based narrative for the first customized media content, wherein the first text-based narrative comprises at least some unique text that differs from text included in an existing text-based narrative of the first media content and is based on the natural language input instead of the existing text-based narrative of the first media content;

identify, by a second machine learning model and based on the first text-based narrative, one or more first video frames of the first media content; and generate the first customized media content using the first text-based narrative and the one or more first video frames, wherein the first machine learning model and second machine learning model are different models.

13. The system of claim 12, wherein the one or more processors are further configured to execute the computer-executable instructions to:

receive a second input associated with a second user, the second input being indicative of second customized media content to be generated based on the first media content;

generate, by the first machine learning model and based on the second input, a second text-based narrative;

identify, by the second machine learning model and based on the second text-based narrative, one or more second video frames of the first media content; and generate second customized media content using the second text-based narrative and the one or more second video frames, wherein the second customized media content is different than the first customized media content.

14. The system of claim 12, wherein the one or more processors are further configured to execute the computer-executable instructions to:

generate a first video segment and a second video segment for first media content of the first media content; and determine that a first video frame of the one or more first video frames is included within the first video segment, wherein the first customized media content includes the first video segment instead of the second video segment based on the determination that the first video frame is included within the first video segment.

15. The system of claim 12, wherein the one or more processors are further configured to execute the computer-executable instructions to:

generate a computer-generated voiceover based on the first text-based narrative, wherein the first customized media content includes the computer-generated voiceover.

16. The system of claim 12, wherein the first input is a text-based or voice query received from a user device.

17. The system of claim 12, wherein the first input is historical data associated with the first user.

18. The system of claim 12, wherein the one or more processors are further configured to execute the computer-executable instructions to:

train one or more computing models using a set of media content.

* * * * *